Oct. 26, 1965  R. K. F. BAUMLE ETAL  3,213,914
SELF-PIERCING NUT WITH ATTACHING GROOVE
Filed Nov. 6, 1961  4 Sheets-Sheet 1
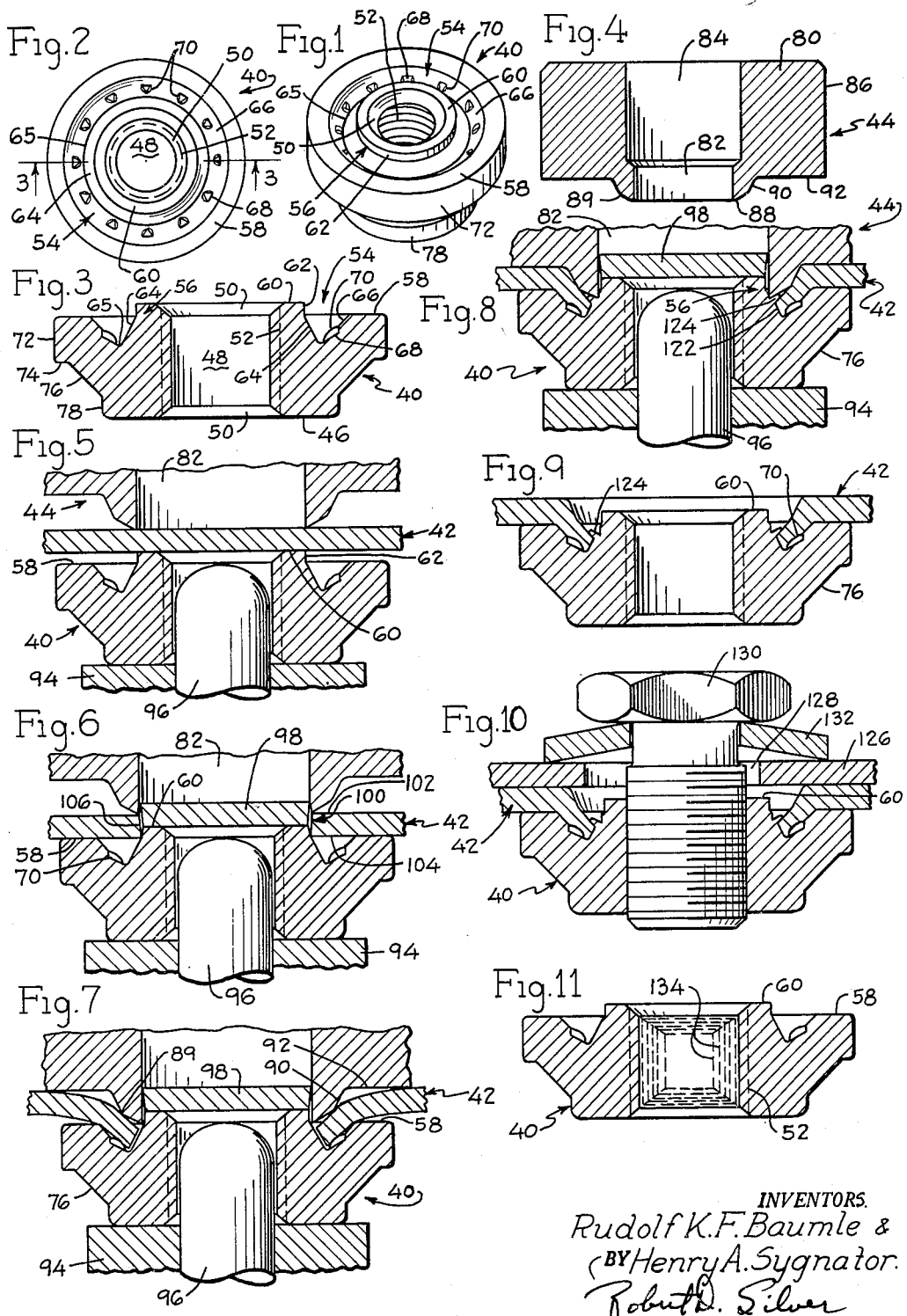
INVENTORS.
Rudolf K. F. Baumle &
Henry A. Sygnator.
BY Robert D. Silver
ATTY.

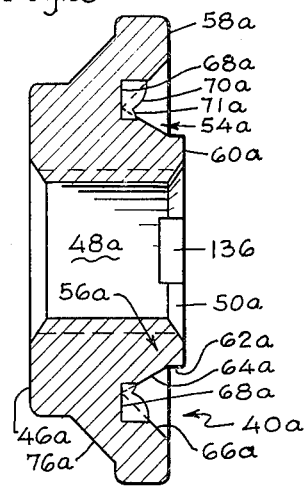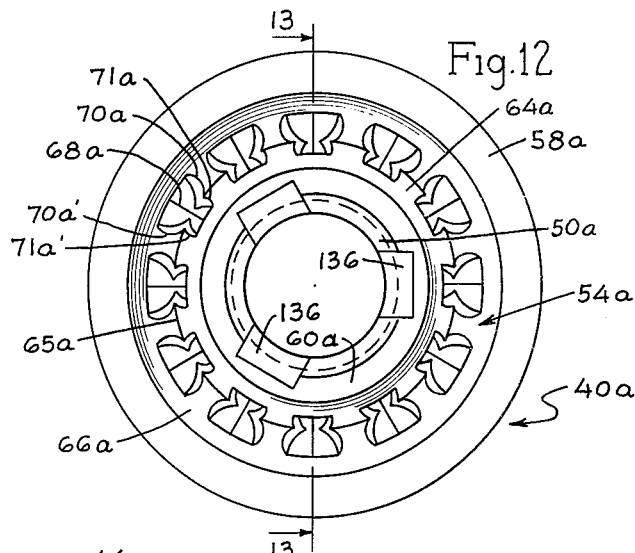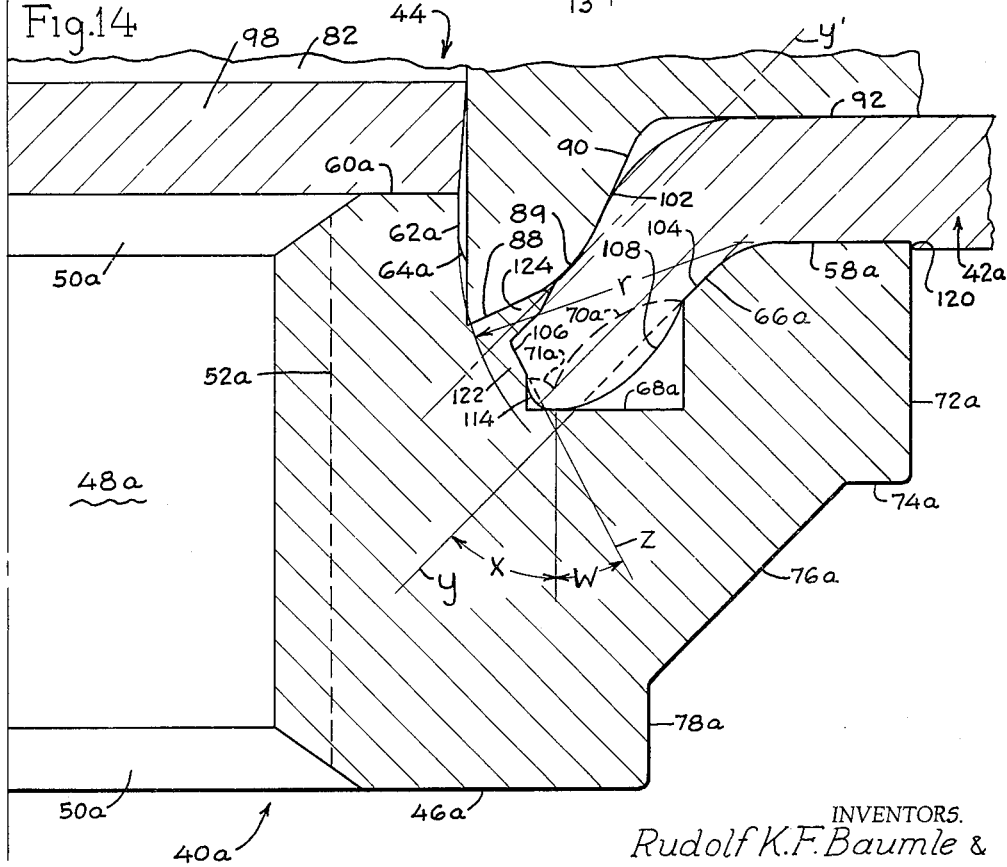

Oct. 26, 1965  R. K. F. BAUMLE ETAL  3,213,914
SELF-PIERCING NUT WITH ATTACHING GROOVE
Filed Nov. 6, 1961  4 Sheets-Sheet 3

INVENTORS.
Rudolf K.F.Baumle &
BY Henry A. Sygnator.
ATTY.

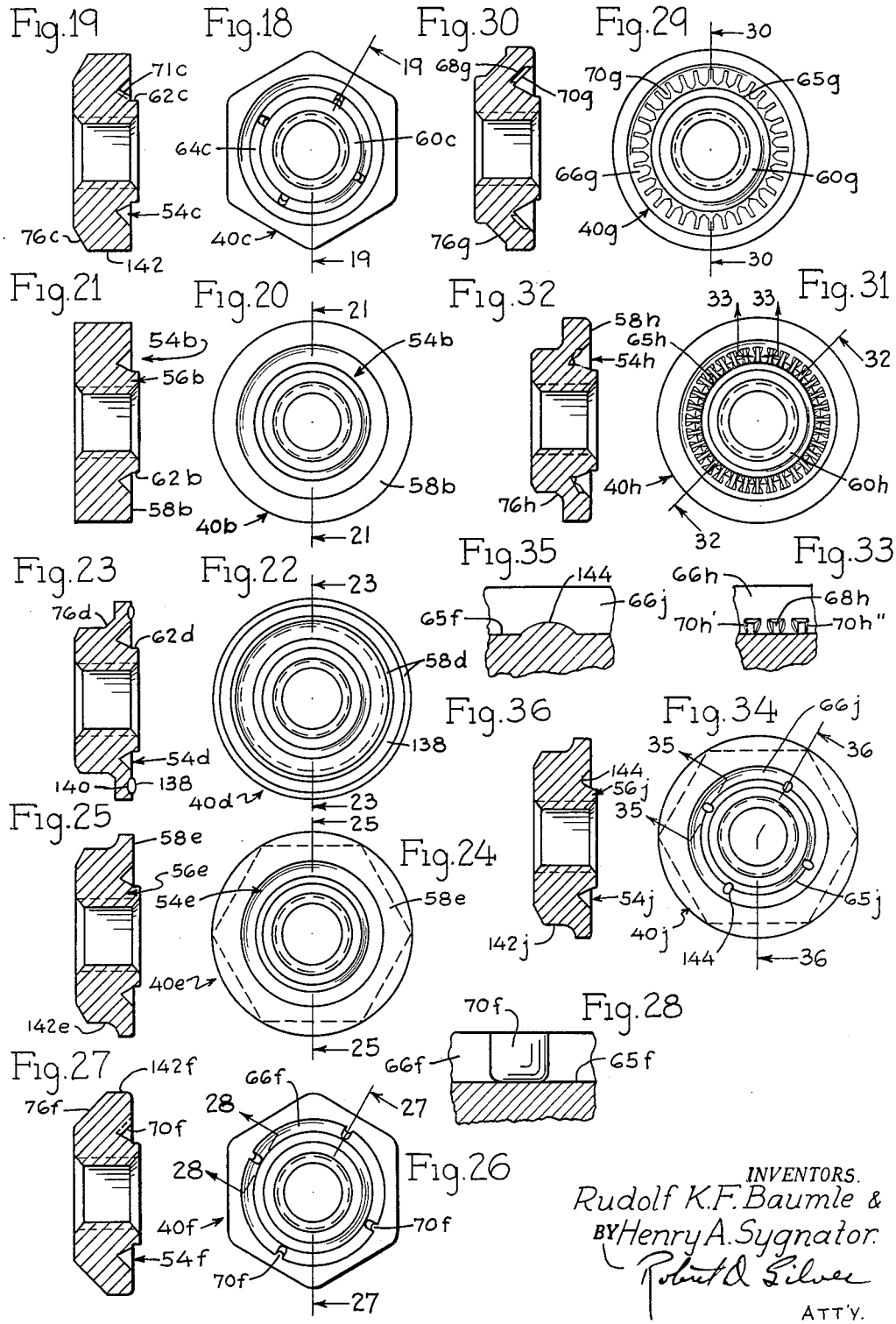

United States Patent Office 3,213,914
Patented Oct. 26, 1965

3,213,914
SELF-PIERCING NUT WITH ATTACHING GROOVE
Rudolf K. F. Baumle, Elgin, and Henry A. Sygnator, Arlington Heights, Ill., assignors to Illinois Tool Works Inc., Chicago, Ill., a corporation of Delaware
Filed Nov. 6, 1961, Ser. No. 150,408
1 Claim. (Cl. 151—41.72)

The attachment of a nut to a panel, prior to the later assembly of a male threaded fastener, has the major advantage of eliminating handling of the nut at such time as the male fastener member is fastened thereto. Heretofore, this has been accomplished by the use of such things as nut cages or the direct uniting of the panel to the nut by swaging, welding, or the like. In the latter two techniques (i.e. the swaging or welding of a nut to a panel) the assembly technique has generally involved the use of a prepunched aperture in a panel and then a post assembling operation to attach the nut to the margins of the prepunched aperture.

This invention is concerned with the technique of utilizing the nut itself as a part of the punching operation to create the hole in the panel, and at the same time as the punching operation occurs, the nut is firmly fastened to the panel. It will be readily perceived that this approach eliminates many handling problems that occur with the assembly of a nut to a prepunched hole. For example, the problems of orienting the nut relative to the prepunched hole is eliminated. Secondly, the double handling of the panel is eliminated. Another advantage to the self-piercing concept is the elimination of problems of relatively undersized and oversized holes or nuts so as to get a tight, snug joint therebetween.

Once it has been decided that the self-piercing concept of assembling a nut and panel together should be used, it might appear to a casual observer that the configurations of the nut and the types of tooling to be used for attachment would be readily apparent. However, this is not the case, and in fact, requires sophistication and understanding of several complex interrelated problems not solved heretofore. These problems are magnified when the nature of the assembly of the nut and panel is such that a high pushout strength is required as well as high antirotational capabilities between the two parts.

It is a general object of this invention to provide a self-piercing nut which is well adapted for piercing a panel and becoming tightly assembled thereto in a manner to provide high pushout strength and high antirotation characteristics.

More particularly, it is an object of this invention to provide a nut wherein all portions thereof are concentric about the central through aperture so that no special orientation of the nut is required to the tooling or assembling the nut to the panel.

More particularly, it is an object of this invention to provide a nut having an annular bearing surface for engagement with the panel, said nut having a central hub portion which surrounds the through aperture and which is spaced from the bearing surface by an annular groove, the hub being characterized in that the top surface thereof projects axially above the bearing face, that portion which projects above the bearing face being cylindrical for enhancing the punching operation.

It is another object of this invention to provide a nut as above characterized wherein the side walls of the hub defined by the groove diverge radially outwardly from the axis of the nut in a manner to provide optimum amount of stock in the hub for later swaging of a portion of the hub into compressive engagement with the end surfaces of the panel aperture margin and in certain instances in overlying relation to the end surfaces.

It is a further object of this invention to provide a nut construction of the above-mentioned general type wherein an antirotational means is disposed entirely within the confines of the groove, said antirotational means being further characterized in that it does not cause splits in the panel and does not derate the pushout strength of the nut and panel in assembled relation.

A further and more specific object of this invention is to provide a nut construction wherein the side of the nut opposite from that having the bearing face is configured in a manner so as to cause a spring-like action which urges the bearing face into snug engagement with the work panel of application after assembly thereto.

A still more specific object of this invention is to provide nuts as above characterized which are well adapted to be configured to receive sealing means in association with the bearing face thereof to provide a watertight seal between the nut and the work panel of application.

A still further object of this invention is to provide a nut as above-identified which is well adapted to being configured to provide prevailing torque lock characteristics upon a threaded fastener when the latter is attached thereto, without derating the other characteristics above set forth.

A still further object of this invention is to provide a nut of the type above-identified wherein there are projections in the axial direction of the nut located within the confines of the groove of the nut which bite into and deform the work panel of application.

A further object of this invention is to provide a method of assembling a nut to a work panel wherein a one piece punching and staking tool is used which successively, together with a nut, punches the panel, pushes the panel margins surrounding the punched aperture into engagement with a groove in the nut, extrudes portions of the hub over the end surface of the panel margin, extrudes the end surface of the margins of the panel into compressive engagement with portions of the hub, and simultaneously controls the configuration of the work panel in the area surrounding the assembly operation.

A further and more specific object of the invention is to provide a method of assembly as above-identified wherein the assembly operation creates an aggressive spring action between the nut and the work panel of application causing a bias towards the assembled rather then the disassembled relationship.

Another object of this invention is to provide a punching tool for use with a nut as above-identified which is one piece and thus has no relatively moving parts and which accomplishes the assembly operation as above set forth in an expeditious and trouble-free manner with a substantial tool life.

The novel features that are characteristic of the invention are set forth with particularity in the appended claims. The invention itself, both as to its organization and the advantages thereof, will best be understood by the following description of various embodiments when read in connection with the accompanying drawings in which:

FIG. 1 is an isometric perspective view of a self-piercing nut constructed in accordance with the inventive concepts;

FIG. 2 is a top plan view of the nut shown in FIG. 1;

FIG. 3 is a slightly enlarged sectional view along lines 3—3 of FIG. 2, the threads in the bore being omitted for purposes of clarity, the radial extent of the roots of the threads being shown semidiagrammatically in dotted lines;

FIG. 4 is a sectional view of a unitary punch member constructed in accordance with the principles of the invention;

FIG. 5 is a sectional view showing the relative position of the parts at the start of the assembly of the nut to a work panel;

FIG. 6 is a view similar to FIG. 5 showing the position of the parts at a later stage in the assembly operation;

FIG. 7 is a view similar to FIGS. 5 and 6 showing the relative position of the parts in a still later stage of the assembly operation;

FIG. 8 is a view similar to FIGS. 5 through 7 showing a still later stage in the assembly operation;

FIG. 9 is a view of the subassembly of the nut and work panel of application after assembly of the nut thereto;

FIG. 10 is a semidiagrammatic view similar to FIG. 9 showing a full assembly of the self-piercing nut and a male fastener member together with a washer and a second work panel;

FIG. 11 is a semidiagrammatic view similar to FIG. 3 showing one basic nut form with diagrammatic showings of the variations in the central through apertures that are possible with this single form;

FIG. 12 is a top plan view of the self-piercing nut of preferred form;

FIG. 13 is a sectional view along lines 13—13 of FIG. 12;

FIG. 14 is a greatly enlarged sectional view, similar in many respects to the upper right hand half of FIG. 8, showing the punch, work panel and nut of FIGS. 12 and 13 being assembled to the panel;

FIGS. 18 and 19 are respectively a plan view and a sectional view of an alternate form of self-piercing nut;

FIGS. 20 and 21 are respectively a plan view and a sectional view of the nut shown in enlarged form in FIG. 17;

FIGS. 22 and 23 are respectively a plan and a sectional view of an alternate form of nut having sealing means in the load bearing face;

FIGS. 24 and 25 are respectively a plan and a sectional view of a self-piercing nut having a hex configuration;

FIGS. 26 and 27 are respectively a plan view and a sectional view of still another form of self-piercing nut;

FIG. 28 is a fragmentary sectional view along lines 28—28 of FIG. 26;

FIGS. 29 and 30 are respectively a plan and a sectional view of still another form of self-piercing nut;

FIGS. 31 and 32 are respectively a plan and a sectional view of still another form of self-piercing nut;

FIG. 33 is a fragmentary sectional view taken along lines 33—33 of FIG. 31;

FIG. 34 is a top plan view of still another form of self-piercing nut;

FIG. 35 is a fragmentary sectional view taken along lines 35—35 of FIG. 34; and

FIG. 36 is a sectional view taken along lines 36—36 of FIG. 34.

Figure 15:
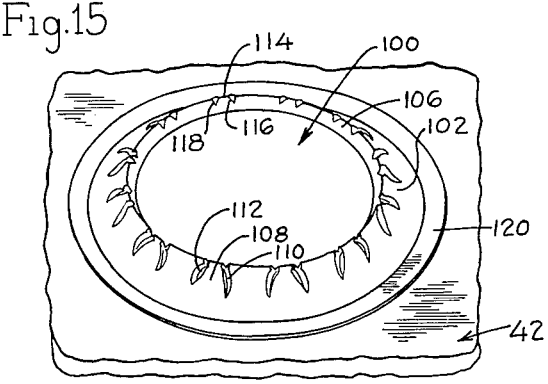
FIG. 15 is a perspective view of the aperture in the work panel and the margins surrounding said aperture formed by the nut shown in FIG. 12.

Referring now to the drawings, FIGS. 1, 2 and 3 show a self-piercing nut 40 which may be characterized as being made of a hard, yet deformable material which is essentially symmetrical about the central axis of the nut, said nut being adapted for self-piercing assembly to an initially non-apertured panel 42. A unitary punch means 44 (see FIG. 4) together with the nut 40, are arranged, configured and actuated in a manner so as to cause the panel to be pierced and assembled in a single operation as shall be explained.

The self-piercing nut 40 has a base portion 46 which is disposed substantially transverse to the axis of the nut and has a central through aperture 48 which is chamfered at 50 at each end thereof. The nut aperture 48 is threaded with suitable threads 52, it being realized that several of the drawings such as FIGS. 3, 5–14, 17–36 show the radial extent of the roots of the threads 52 semidiagrammatically as a dotted line. The side of the nut 40 opposite to base 46, is formed with an annular groove means 54 which projects axially into the body of the nut, said groove means 54 defines a central piercing and attaching post 56 which is also concentric with the through aperture 48 and also defines a load bearing flange surface 58 which is substantially parallel with base surface 46. The piercing and attaching post 56 is formed with a top surface 60 which is parallel with load bearing flange 58, said post 56 projecting above the axial extent of flange 58. It should be particularly noted that the portion 62 which projects above flange 58 is cylindrical in shape or stated another way, the periphery of the post which projects above the flange 58 is preferably in a plane which is substantially parallel to the axis of the nut.

The groove means 54 is generally V-shaped in cross section and has a groove inner wall 64 and a groove outer wall 66 which meet at base 65 of the groove. The groove inner wall 64 forms the outer wall of the post 56 and, thus, the post 56 is considerably larger at its inner end than it is at its outer end adjacent surface 60. The relative angularity of the walls 64–66 and other considerations which aid in providing an effective groove means 54 will be discussed in detail hereinafter.

A plurality of generally radial grooves 68 and raised projections 70 are formed in the annular groove outer wall 66. In the form of nut 40 in FIGS. 1 through 3, the individual grooves 68 and projections 70 are formed by a "post" operation after the groove means 54 in the nut has been formed. The "post" operation essentially comprises the using of a tool (not shown) which has generally triangular projections, in a manner to engage and distort the groove outer wall 66 so as to impress a plurality of triangular indentations or grooves 68, the metal displaced around the side edges of the indentations or grooves 68 causing the formation of projecting lips 70 which are raised above the plane of the wall 66 so that the lips 70 extend or project in direction parallel with the central axis of the nut. While the grooves or indentations 68 are generally radially aligned with the axis of the nut, the projections 70, on either side of the indentations 68 are offset from true radial lines.

The radially outward peripheral side of the nut is preferably formed with a first substantially vertical wall surface 72, a short horizontal portion 74, a conical portion 76, and a second substantially vertical surface portion 78 which intersects with the base portion 46. It will be noted that the base portion 46 has a radial extent that is preferably larger than the radial extent of the base 65 of the groove means 54. The outer configuration of the nut, particularly the radial extent of the base portion 46 and the use of the conical wall portion 76 have a dual purpose of conserving on the amount of metal needed in the nut and the additional, and perhaps more important consideration, of providing a structure which imparts a spring action after the final assembly which will be later discussed. The height of the vertical portion 72 on the radial periphery of the nut is important in certain types of feeding units (not shown) to prevent a camming action of adjacent nuts for better automatic handling and feeding thereof. In certain other types of feeding units (not shown) it is not necessary to have as great a vertical height of portion 72 as shown in FIGS. 1 through 3, and in those instances, conical portions 76 may be extended.

The unitary punch means 44 is shown in FIG. 4 and the bottom portion thereof is also shown in enlarged sectional view in FIG. 14. The punch means is associated with any suitable ram (not shown) and coacts with the nut 40 and panel 42 as shall be explained. The punch means essentially comprises an annular body 80 formed of tool steel having a central bore 82 which is slightly larger (by a few thousandths of an inch) than the diameter of cylindrical portion 62 of the post 56 of the nut means 40. A counter bore 84 is also formed therein larger than bore 82 and is concentric therewith. The lower side of the body 80 (in the position as shown in the drawings) is the operating face of the punch means and is formed with a depending portion which is concentric with bore 82. As best seen in FIG. 14, the lower side of punch means 44 is formed with a first radial surface 88 located immediately adjacent to the bore 82. The surface 88 diverges from the axis of the bore 82 at a predetermined angle greater than the angle of the plane of the outer wall 66 of the groove means 54 of the nut, when the axis of the nut 40 and the axis of bore 82 are aligned. The punch means 44 is also formed with a second radial surface area 90, adjacent to surface 88, which diverges from the axis of the bore 82 at an angle less than the angle of the plane of the outer groove side wall 66. A third radial surface area 92 on the lower face of the punch body 80 is considerably larger than areas 88 and 90 and is disposed substantially normal to the axis of the bore 82. The functions of these radial surface areas of the punch, along with surface area 89 which is at the juncture of the surface areas 88 and 90, will be discussed in detail hereinafter.

In the assembly of the panel 42 and nut 40, the nut 40 is preferably aligned on a projecting pin 96 which extends from an anvil 94 which is in turn mounted on a ram platen (not shown). It will be appreciated that relative movement of the nut and punch means are required and it is immaterial whether one or both are moved as long as the relative movement is supplied. Further, it is immaterial whether the nut is on top or bottom relative to the panel or in any other special relationship as long as the relative positions of the punch, panel, and nut are retained. Pin 96 is inserted within the bore 48 of the nut 40 and preferably is in nonthreaded relation thereto, the top of the projecting pin 96 being less than the height of the post 56. The anvil 94 may be a part of any suitable press (not shown) and is well adapted to be inserted into a panel former (not shown) of any suitable configuration.

After the nut means 40 is inserted over the projection 96, the top surface 60 of the post 56 is brought into engagement with one side of an initially nonapertured panel 42 and the punch means 44 is aligned with the nut means 40. It will be noted that the panel 42 is initially spaced from the load bearing surface 58 of the nut 40. Compressive pressure is then applied to the punch means 44 and the anvil 94 which in turn causes the post 56 together with the punch means 44 to shear a slug 98 in the panel 42 to form a panel aperture 100. Since post portion 62 is cylindrical, it forms a sharp edge with top surface 60, and this sharp edge together with the concentration of the forces at the shearing edge juncture of the bore 82 and radial surface 88 of the punch, assures that a clean aperture 100 is formed. This is important since the later bending operation of the margins of the aperture 100 in the panel 42 would greatly exaggerate any raggedness in the hole leading to very undesirable stress cracks in the panel 42 which would substantially weaken the assembly. Further, the cylindrical portion 62 assures that immediately after the punching of the slug 98, that the panel 42 will move down and immediately come into engagement with flange 58 of the nut as shown in FIG. 6 for a complex bending, swaging, and extruding operation which will now be described.

Continual compressive force applied to the anvil 94 and the punch means 44 causes the margins of aperture 100 in the panel to widen and bend so as to be brought into snug engagement with the groove means 54. More particularly, as the punch 44 descends from the position shown in FIG. 6 to the position shown in FIG. 7, a portion of surface 88 on the punch engages the upper surface 102 of the panel immediately adjacent to the aperture 100 causing the panel to bend downwardly. During this bending operation, due to the angles involved, the particular portion of surface 88 in engagement with upper surface 102 of the panel 42 progressively moves radially outwardly to impart a somewhat rolling engagement. (See FIG. 14.) When the punch has reached the position of FIG. 7, the essential bending of the panel is completed. At this stage the edge at juncture of the punch portion 88 and the bore 82 starts extruding and swaging metal 122–124 from the post outer side wall 64 and the surface 89 of the punch bites into and extrudes and elongates the material of the panel 42. This simultaneous action by the punch causes the end surface 106 of the panel aperture 100 to come into compressive engagement with nut post portion 122 and also assures a firm seating of the underside 104 of panel 42 adjacent the aperture 100 with surface 66a of the groove 54. This will be described in greater detail relative to FIG. 14.

The aforementioned elongation and swaging operation also causes the projections 70 to bite into the under side 104 of the panel and causes a portion 124 (see FIG. 8) of the post to be extruded over the end surface 102 of the panel. The end surface 106 of the panel aperture is thus held in strong compressive engagement with portion 122 of the post 56 and the bearing surface 58 of the nut is forced into strong engagement with the under side of the panel and as shall later be explained relative to FIG. 14, a spring action aggressively urges bearing surface 58 into engagement with the panel after removal of the punch and anvil.

The anvil and the punch are then removed leaving a subassembly such as shown in FIG. 9. This subassembly is then adapted to be assembled with a second panel 126 having an aperture 128 by use of a headed fastener 130 and, if desired, a conical washer 132. It will be noted that it is preferred that the top surface 60 of the nut projects above surface 58 of the nut a distance less than the thickness of panel 42 such that misalignment of the aperture 128 relative to the nut is possible.

In FIG. 11, the dotted lines 134 show various configurations of central bore and counterbores for the nut 40, the desired configuration depending upon the size of threads desired. By changing the diameter of the central through bore 48 and shortening the axial lengths along the lines shown, a single nut blank will accommodate a variety of sizes of male bolt fasteners without requiring a change in the punch in the assembly operation.

The preferred form of self-piercing nut 40a is shown in FIGS. 12, 13 and 14. Similar parts will be identified with similar reference numerals with the addition of the suffix "a." The essential characteristic in which the nut 40a of FIGS. 12 through 14 differ from the aforedescribed nut 40 is in the radial grooves 68a and the resulting projections 70a–70a' and 71a–71a'. This self-piercing nut 40a also has prevailing torque lock characteristics which are an optional feature with most of the forms of nuts shown and which may be placed on the threads on either hub side 60a or base 46a without derating the other characteristics of the nut. Except in these respects, the nut 40a is identical to the nut 40 aforediscussed. Since FIG. 14 is greatly enlarged it will be a convenient place to discuss the essential considerations of the configurations of the grooves 68 and 54 and the structure for causing of the spring action of the bearing face 58 against the panel.

The radial grooves 68a and the projections resulting therefrom interrupt both side walls 66a and 64a of the groove 54a. It will be observed that the base of the V-shaped radial groove 68a is parallel to the nut base surface 46a. The radial grooves 68a are conveniently formed by impressing a plurality of V-shaped forming tooth projections (not shown) into a nut having a preformed groove 54a. The V-shaped projections upon meeting the angularly disposed side walls 64a and 66a, causes the metal to be displaced from the planes of the respective groove walls 64a–66a. The projections 70a–71a project a substantial axial distance above the plane of the groove wall 64a and 66a and are relatively sharp. The projections 70a and 71a have a somewhat hourglass shape in plan view, projections 70a–70a' and 71a–71a' diverging away from each other as shown in FIG. 12. It will be noted that a greater portion of the radial groove 68a is formed in the outer side wall 66a and only a short portion intersects with the inner side wall 64a and thus, projections 70a and 70a' are considerably higher than the projections 71a–71a'.

Groove 54a per se has an inner side wall 64a which diverges from the axis of the nut at an angle $w$, and the outer wall 66a diverges from the axis of the nut at a greater angle $x$. Angle $x$ is approximately 45° and angle $w$ is approximately 28°. Lines $y$ and $z$ respectively, are construction line extensions of the planes of the groove walls 66a and 64a. The plane of the groove inner wall 64a is further characterized in that it lies entirely within a hypothetical line in space described as a segment $r$ of a radius of the nut rotated in the plane of the axis of the nut and about the junction of the surface 58a and the groove wall 66a, said segment $r$ having a length equal to the width of the groove 54 at the mouth thereof taken in the plane of surface 58a. It is desired to provide the optimum amount of stock on the post 56a for engaging the margin of the aperture 100 in panel 42. The precise angle of wall 64a is determined by the amount of foreshortening of the panel material in the bending operation such that as the panel is being bent to its position in FIG. 7, it does not engage the walls of the post 56a, but just misses them.

A construction line $y'$ parallel to construction line $y$ is shown in FIG. 14 to indicate the relative angles of the punch surfaces 88, 90 and 92 relative to the angles $x$ and $w$ of the walls of the groove means 54a. It will be noted that the first radial extent 88 of the punch means 44 is disposed at an angle to the axis of the punch which is a substantially greater angle than the angle $x$. Further, it will be noted that radial area 90 of the punch is at a lesser angle to the axis than angle $x$. The angularity of radial surface 88 of the punch serves to provide stock for back-up strength to the shearing edge of the punch adjacent to the bore 82 as well as for other reasons to be set forth.

In the initial bending operation of the panel (between FIGS. 6–7), progressively radially larger increments of the punch come into operation with the panel surface and a rolling action takes place which does not cause excessive wear on the punch. Also the punch area 89, after the panel material has been bent, but before extruding thereof takes place, by virtue of being axially offset from the shearing edge leaves a space for the swaged portion 124 of the nut to move into. Stated another way, since punch portion 88 is at an acute angle (is not horizontal as contrasted with the punch in FIG. 16), there is room for extruded portions 124 of the post 56a to move over the end of the panel surface 102. In addition to extending the post portion 124 over the panel, it is necessary for the obtainment of a good tight joint between the nut and the panel, that portion 89 of the punch skate down the surface 102 of the panel to thereby cause the panel to elongate in the vicinity of the aperture 100. This elongation of the panel forms a tight compressive bond with the material 122 of the nut. In essence, the material 122 at the base of the nut post 56a is forced into opposition with the end surface 106 of the panel aperture 100. Also, punch portion 89 causes the panel material at 108 to be extruded down into the confines of the radial groove 68a as shown, and further causes a portion 114 of the panel margin to be extruded beyond the end surface 106 into engagement with the radially inner end of the groove 68a (to the left in FIG. 14). Portion 89 of the punch moves the panel adjacent to the margin so as to also cause the projections 70a–70a' and 71a–71a' of the nut to upset the panel material and form complementary grooves therein. Projections 70a–70a' form grooves 110 and 112 and projections 71a–71a' form grooves 116–118. Due to the angles involved in the projections and grooves, exceptionally strong antirotating characteristics in both rotational directions are imparted between the nut and panel. The panel with the grooves 110–112, 116–118 has a configuration essentially as shown in FIG. 15 after assembly to the nut 40a.

Since metals have a characteristic called spring back, it is preferred that surface 92 and juncture 89 of the punch be so arranged, configured and actuated as to slightly overbend the panel material as well as slightly distort the nut 40a within the elastic limits thereof. More particularly, it is desired that the load bearing flange 58a of the nut and the material in the nut portion below surface 58a be slightly overstressed so that the natural spring action of the material will cause portion 58a to aggressively urge against the underside of panel 42a. By configuring and actuating punch surface 92 such that it will compress the material of panel 42 between the flange 58a, a stress is imposed on the radially outwardly part of the nut, which upon release of the punch means 44 causes the material to try to return to its original state. If the panel material is firmly anchored by the compressive forces between portions 106 of the panel and portions 122 of the nut, as well as by the overlaying nut portion 124, the radially outwardly portion of the nut, which has been reduced in thickness to form surface 76a provides an action similar to that of a conical washer spring action against the panel. Since over travel of portions 89 and 92 of the punch forces the panel 42 and portions of the radial flange of the nut radially outwardly it tends to try and return. This causes a very snug engagement of nut wall portion 66a with portion 104 of the panel, and also causes aggressive engagement of panel aperture edge 106 with nut portion 122. Further, the spring back action enhances the antirotation characteristics of the nut and panel assembly. Several coacting relationships impart the antirotational characteristics to the assembly and are aided by the spring back, namely; the coaction of the projections 71a–70a and the complementary grooves 110–112–116–118; the tight engagement of panel portion 106 and nut portion 122; the coaction of portion 124 overlying surface 102 of the panel; and the snug engagement of radial load bearing flange 58a with the under side of the panel. It will be noted that a slight groove 120 occurs in the panel caused by the over travel of the punch; said groove 120 being formed by the load bearing surface 58a and is best shown in FIG. 15. The stressing and hence spring back of the nut is greater than the depth of groove 120 and hence load bearing flange 58a remains in engagement with the panel after removal of the punch.

The prevailing torque lock means 136 is adapted to be associated with the nut 40a and may be conveniently formed by a "stabbing" operation with suitable tool not shown) on the surface 50a of the base 46a (not shown) or the inside of top surface 60a of the post at three spaced points as shown. This operation compresses the threads adjacent to the top or bottom side of the nut. This is done after the threading operation in the nut, and due to the location as shown in FIG. 12, does not derate the nut from a self-piercing standpoint.

Figure 16:
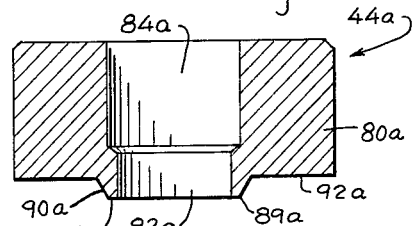
FIG. 16 is a sectional view of an alternate form of punch.
Figure 17:
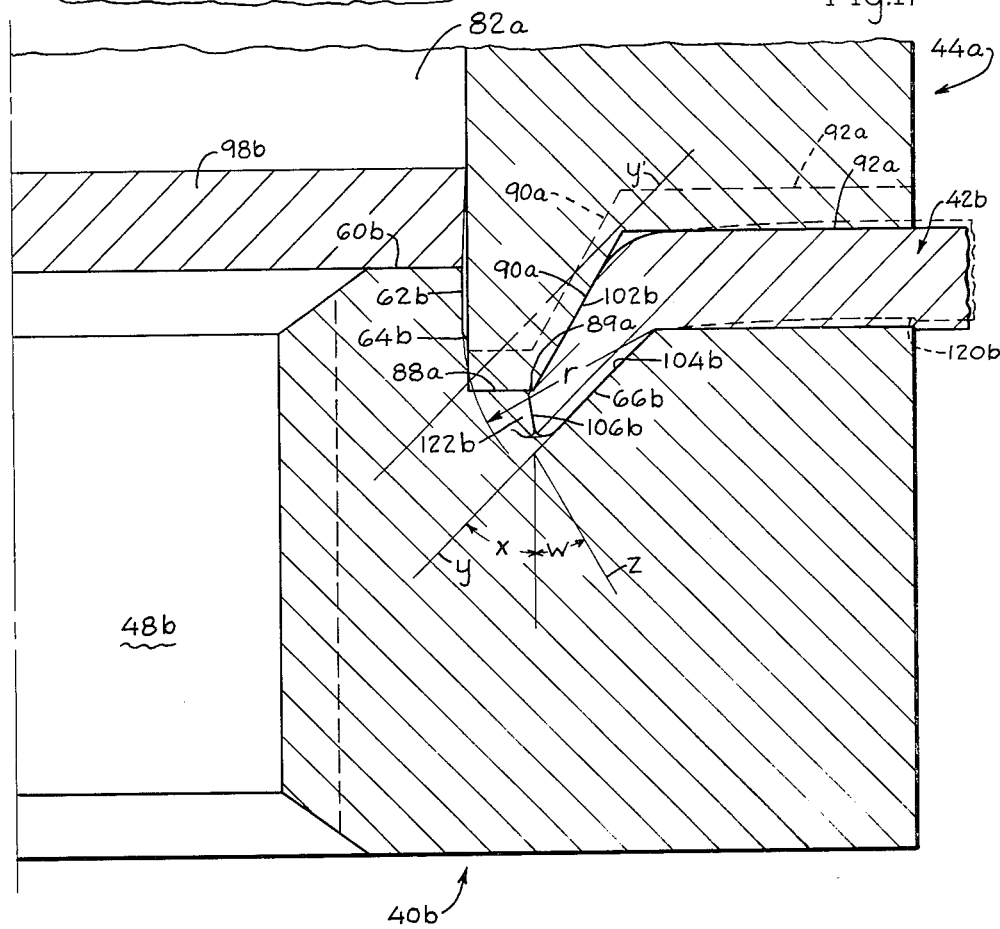
FIG. 17 is an enlarged view similar to FIG. 14 showing the punch of FIG. 16 in conjunction with the nut shown in FIGS. 20 and 21 as it is being applied to a work panel.

The punch 44a shown in FIGS. 16 and 17 is substantially similar to punch 44 aforedescribed and similar parts will be identified by similar reference numerals together with the suffix "a." The essential difference between punch 44a and punch 44 is in punch radial surface 88a. As shown, radial surface 88a is disposed substantially normal to the axis of the punch and defines a rather sharp corner 89a at the juncture of radial portions 88a and 90a. The sharpness of corner 89a of the punch increases the biting action for elongation of the panel adjacent the aperture. This construction provides an even stronger punching surface than does portion 88 of punch 44 since there is more back up strength to the shearing edge adjacent the bore 88a. With the punch 44a, it is not possible to provide material from the post on the nut 40b to be placed into overlaying relation with portion 102b of the panel. However, a surprisingly strong compressive bond is made between the extruded portion 122b of the post which is placed into compressive engagement with the aperture end portion 106b of the panel. Since the nut 40b illustrated in FIGS. 20 and 21 is not configured for the over travel spring back of nuts 40 and 40a as discussed, the compressive forces between portions 106b and 122b cause the panel and nut to move to the position shown in dotted line in FIG. 17 after assembly thereof. It will be particularly noted that nut 40b is not radially relieved outboard of the groove 54b and thus the radial spring back is negligible. In many respects the nut 40b is similar to nuts 40 and 40a and similar parts are identified with similar reference numbers with the addition of the suffix "b." On applying a male fastener to the assembly shown in FIG. 17, the compression between portions 106b and 122b increases due to the force applied to the panel to thereby aggressively urge the assembly of the nut and panel together.

A surprising amount of push-out strength and antirotational strength is provided by the nut 40b and the panel 42b when the punch 44a and nut 40b are used. The engagement of panel surface 104b with surface 66b of the nut, together with compressive engagement of portions 122b and 106b, gives push-out and antirotational characteristics considerably greater than might be expected. In fact, push-out strength in excess of 100 pounds per square inch has been obtained with the construction shown in FIG. 17 and torque in excess of 100 inch pounds is required to impart rotation to the nut 40b relative to the panel. On the other hand, the construction shown in FIG. 14 will give push-out strength in excess of 400 pounds per square inch and antirotational strength in excess of 500 inch pounds.

It will be noted that the groove 54b of the nut 40b and the configurations of punch 44a are basically the same as those aforediscussed and the same considerations apply except for the antirotational characteristics and the angularity of surface 88a of the punch. In the assembly operation, the single punch 44a performs all of the functions of punch 44 except providing an extrusion of material of the post over the panel.

The nut shown in FIGS. 18 and 19 is substantially similar to the ones heretofore described and similar parts will be identified with similar reference numerals with the addition of th suffix "c." The nut 40c has an essentially hex configuration which is sometimes desirable in some feeding operations and for certain applications. The projections 71c are disposed on the groove inner wall 64c only. These projections 71c are entirely within the confines of the groove and are not as advantageous as the projections described relative to nuts 40 and 40a but do impart a greater antirotational characteristic as contrasted to nut 40b. All of the nuts shown which have projections such as 70–71, have the projections located entirely within the confines of the groove means 54 and more particularly, it is most important to have no projections on the bearing face 58 of the nut. It has been demonstrated in actual tests, that the placing of projections on the surface 58 of the nut serves as a "torque robber," which actually derates the antirotational strength of the subassembly of the self-piercing nut with a panel.

The nut shown in FIGS. 22 and 23 is substantially similar to those aforedescribed and similar parts will be given similar reference numerals with the addition of the suffix "d." The nut shown in FIGS. 22 and 23 has an additional groove 140 located in the bearing face 58d which is concentric with the groove 54d. Within groove 140 is disposed a ring of elastic sealing material 138. In certain applications where increased certainty of absolute sealing is desired, the additional ring of sealing material 138 is advantageous in providing this function.

The self-piercing nut shown in FIGS. 24 and 25 is substantially similar to the foregoing, and similar parts will be given similar reference numerals with the addition of the suffix "e." The nut 40e is essentially a washer face type nut having an enlarged load bearing surface 58e in conjunction with a hex nut side wall surface.

FIGS. 26 and 27 show still another form of self-piercing nut and similar parts will be identified with similar reference numerals together with the suffix "f." The nut 40f has an overall hex configuration similar to the nut 40c of FIGS. 18 and 19 and differs therefrom in that the projections 70f are disposed entirely and only on the outer wall 66f of the groove means 54f. It is to be pointed out relative to the projections 71c and 70f, that these are formed in the initial forming operation of the groove 54 during formation of the nut, in a nut former, and it has been found that while they do impart antirotational characteristics to the assembly of the nut and the panel, they are not as efficacious as are the projections 70, 70a, and 71a which are formed in a "post" operation as aforedescribed. It is believed that the reason for this is that within the confines of the groove itself, it is very hard to get sharp interfering edges on the projections such as 71c and 70f in the initial groove forming operation, the sharp projections being a characteristic of the "post" formed grooves and projections.

FIGS. 29 and 30 show still another form of self-piercing nut with projections and grooves and similar reference numerals will be used as used in the foregoing embodiments with addition of the suffix "g." The nut 40g has the same outer configuration as does the nuts 40 and 40a illustrated in FIGS. 1 through 3 and in FIGS. 6, 12, and 13. The essential difference lies in the shape of the projections 70g. It will be noted that the tops of projections 70g are actually relatively elevated to the base of radial groove 68g. The projections 70g are formed in the initial forming operation of the nut 40g. Actually, the tops of projection 70g are in the plane of the outer groove wall 66g. This form of projections and grooves of nut 40g has been found more efficacious in affording antirotational characteristics than in forms shown for example in FIGS. 18, 19, 26 and 27, but do not operate as well as those shown in FIGS. 1–14.

The nut shown in FIGS. 31 and 32 illustrates still another form of self-piercing nut 40h and similar parts will be identified with similar reference numerals together with the suffix "h." The essential differences between the nut 40h and the nut shown in FIGS. 12 and 13 relates to the fact that a more rugged tool having generally V-shaped projections (not shown) is used to form the radial grooves 68h. The projections on this tool are flattened at the ends rather than knife point. This affords a longer tool life on the projections of the tool that imparts the serrations or grooves 68h and resulting projections 70h into the annular groove means 54h. The nut 40h is further modified in that the base 65h of the groove means 54h has a substantial extent and is parallel with surfaces 60h and 58h of the nut. Since the serrations or grooves 68h are put into the walls of groove means 54 in a "post" operation, material is extruded to the form as shown in FIG. 33 to provide projections 70h and 70h' on either side of the groove 68h.

A still different form of self-piercing nut 40j is shown in FIGS. 34 and 36, and similar reference numerals are used with the addition of the suffix "j." In this form of the nut, a projection 144 is placed across the base of the groove means 54j in the initial forming operation. As best seen in FIG. 35, this type of projection 144 has somewhat rounded surfaces and hence is not as advantageous in preventing rotation of the panel relative to the nut 40j after assembly thereto.

Although specific embodiments of the invention have been described in detail, it is with full awarness that many modifications thereof are possible. The invention, therefore, is not to be restricted except insofar as is necessitated by the prior art by the spirit of the appended claim.

What is claimed as the invention is:

A nut adapted for self-piercing attachment to a sheet of deformable material, comprising a body of hard deformable metallic material having a threaded central bore therethrough, a substantially V-shaped circular groove in a first end face of said body spaced from the inner and outer edges thereof, said groove defining an attaching post having a tapered portion defining the radially inner wall of said groove and a cylindrical portion extending axially beyond said groove, said post having a planar top surface extending generally transversely from the axis of said nut for engagement with said complementary sheet of deformable material, the tapered portion of said post being of larger diameter than the cylindrical portion over the entire extent thereof, said tapered portion providing material to be swaged over that portion of the complementary sheet adapted to be received in the groove, a load bearing portion on said first end face lying in a plane parallel with said top surface of said post and lying radially outwardly of said groove, said planar top surface being located axially above said load bearing portion, the cylindrical portion of said attaching post defining a side wall portion extending axially beyond said load bearing portion so that the area of the juncture of said cylindrical side wall portion and said top surface form a substantially sharp circumferentially continuous shear edge for piercing the sheet of material with which the nut is to be associated, said nut having a second end face generally parallel with said top surface defining the opposite end of the nut, the radial extent of said second end face being greater than said post, an outer side wall of said nut in the area axially intermediate said second end face and said load bearing portion being characterized as having at least a portion which is angularly arranged and convergent toward the axis of the nut in a direction toward said second end face to define a substantially frusto-conical surface, said frusto-conical surface terminating in a plane axially spaced from said second end face and being at the point of intersection with said plane of substantially the same radial extent as said second end face to define reduction in thickness of the nut at said second end face thereby imparting a resilient characteristic to said load bearing portion, said circular groove being formed by the aforesaid radially inner wall and a radially outward wall, every portion of said groove having a transverse cross section wherein said inner groove wall diverges from a plane parallel with the axis of the nut at an angle less than the angle of divergence from said plane of said outer groove wall, every radial cross section of said groove wall lying on a line entirely within a surface generated in space by a segment of a radial line of the nut, said segment having a length equal to the width of said groove at the mouth thereof, when said segment is rotated about the juncture of the outer groove wall and the load bearing surface in a plane of rotation which includes the axis of the nut, said groove having a plurality of symmetrically spaced tooth-like projections disposed therein with the major portion of each of said projections being disposed in the outer wall of said groove.

References Cited by the Examiner

UNITED STATES PATENTS

| | | | |
|---|---|---|---|
| 521,825 | 1/94 | Shipe | 29—432 |
| 1,298,583 | 3/19 | Sharp. | |
| 1,759,339 | 5/30 | Andren | 151—41.72 |
| 1,919,552 | 7/33 | Hasselquist | 151—41.7 |
| 2,007,179 | 7/35 | Bullis. | |
| 2,110,039 | 3/38 | Double | 151—41.72 |
| 2,174,549 | 10/39 | Blaho. | |
| 2,281,699 | 3/42 | Langmaid et al. | 151—41.72 |
| 2,359,031 | 9/44 | Goshia | 151—41.72 |
| 2,462,023 | 2/49 | Johanson et al. | 85—32 |
| 2,696,139 | 12/54 | Attwood | 151—41.75 |
| 2,707,322 | 5/55 | Strain et al. | 151—41.73 |
| 2,749,606 | 6/56 | Donahue | 29—432 |
| 2,750,660 | 6/56 | Newcomb | 29—432 |
| 3,000,420 | 9/61 | Spokes | 151—41.73 |
| 3,014,609 | 12/61 | Hobbs | 151—41.72 |
| 3,053,300 | 9/62 | Quinto | 151—41.72 |
| 3,056,443 | 10/62 | Knocke | 151—38 |

CARL W. TOMLIN, *Primary Examiner.*

EDWARD C. ALLEN, *Examiner.*